United States Patent [19]

Johansson

[11] 4,086,984

[45] May 2, 1978

[54] VIBRATION DAMPER FOR IMPACT TOOL

[75] Inventor: Folke Ingvar Johansson, Saltsjo-boo, Sweden

[73] Assignee: Atlas Copco Aktiebolag, Nacka, Sweden

[21] Appl. No.: 725,565

[22] Filed: Sep. 22, 1976

[30] Foreign Application Priority Data

Oct. 9, 1975 Sweden ............................... 7511305

[51] Int. Cl.[2] .......................... F16F 9/10; B25D 17/12

[52] U.S. Cl. ..................................... 188/1 B; 181/230; 299/94

[58] Field of Search ........................... 74/574; 188/1 B; 408/143; 181/33 A, 33 B; 299/94

[56] References Cited

U.S. PATENT DOCUMENTS

| | | | |
|---|---|---|---|
| 2,195,041 | 3/1940 | Von Schlippe | 188/1 B X |
| 2,375,818 | 5/1945 | Peters | 188/1 B X |
| 2,606,366 | 8/1952 | Stevens | 408/143 UX |
| 3,141,523 | 7/1964 | Dickie | 188/1 B |
| 3,653,625 | 4/1972 | Plice | 188/1 B UX |
| 3,662,855 | 5/1972 | Adams et al. | 181/33 A |
| 3,848,931 | 11/1974 | Swisher | 181/33 A X |
| 3,856,107 | 12/1974 | Rabett | 299/94 X |

*Primary Examiner*—Duane A. Reger
*Attorney, Agent, or Firm*—Flynn & Frishauf

[57] ABSTRACT

A vibration damper for an impact tool comprises an envelope which surrounds a working part of the tool and thereby encloses a liquid-like material having damping properties.

12 Claims, 5 Drawing Figures

VIBRATION DAMPER FOR IMPACT TOOL

The present invention relates to impact tools comprising a vibration damper for damping lateral vibrations of a working part of the tool. Examples of such tools are breakers for breaking up concrete pavements and the like, spades and chisels of different kinds and drill rods for rock drilling.

A tool of the above mentioned kind is designed to transfer considerable impact energies in its longitudinal direction from an impact machine, to which the tool is connected, to the material being worked. In order to damp the emission of sound from the tool, caused by lateral vibrations of the tool, one has earlier used either sleeves of rubber or plastic surrounding the tool or channels in the tool filled with damping material e.g. certain metal alloys or sand.

SUMMARY OF THE INVENTION

According to the present invention the vibration damper comprises an envelope which surrounds the working part of the tool, preferably along a shorter part of its length, and encloses a liquid-like material. Liquid-like material hereby refers to a liquid with or without admixtures. A liquid is hereby defined as a body having an indefinite form but a definite volume. This material can be enclosed either in a single-walled envelope, in which case it is in direct contact with the working part of the tool or in a double-walled envelope, in which case it is not in direct contact with the working part of the tool. As examples of suitable liquid-like materials one could mention unvulcanized silicon rubber, silicon grease, oils and other liquids containing dispersed or dissolved polymeric material or dispersed solid material e.g. iron powder.

By means of the present invention a more even distribution of heat is obtained in the damper than in rubber or plastic dampers, which results in a lower temperature and thereby a longer service life. The rubber material in rubber dampers often reaches such a high local temperature that it is broken down. A tool according to the present invention is considerably cheaper to manufacture than those tools which are provided with internal channels filled with damping material.

According to a preferred embodiment of the invention the liquid-like material in the vibration damper comprises a liquid which hardens when in contact with oxygen or humid air. The vibration damper is in this way made self-sealing.

DETAILED DESCRIPTION

Figures 1, 2:
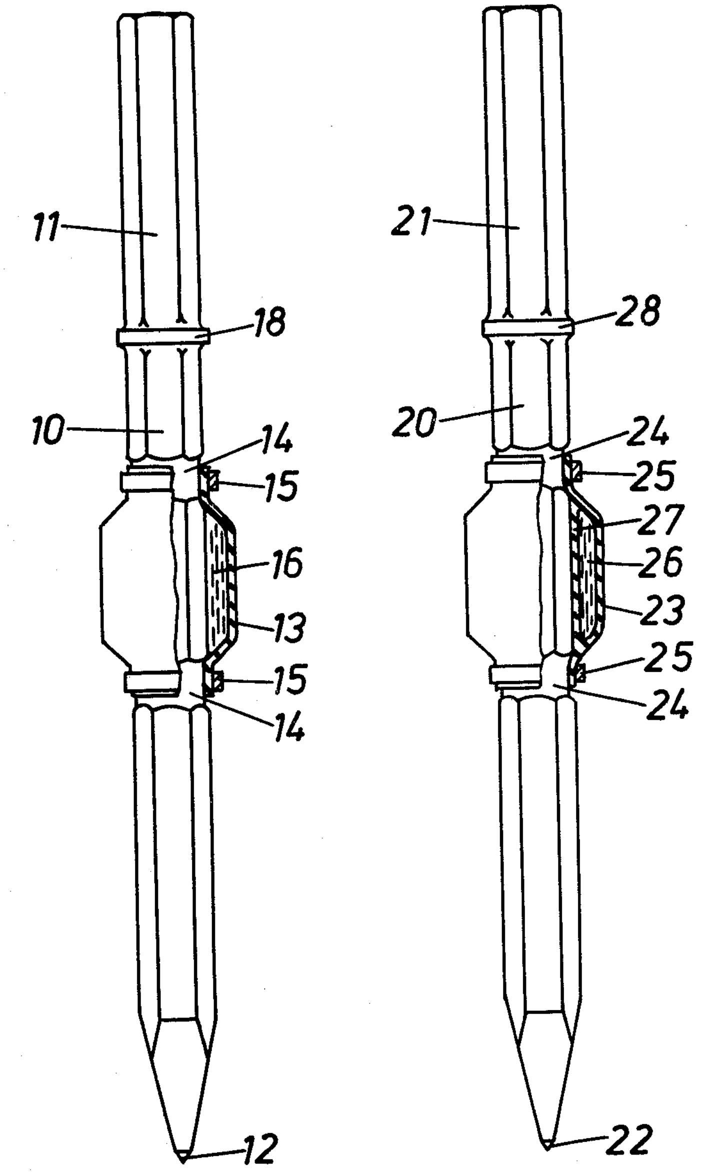
FIG. 1 shows an embodiment of the invention where the vibration damper comprises a single-walled envelope.
FIG. 2 shows an embodiment of the invention where the vibration damper comprises a double-walled envelope.

The tool according to FIG. 1 comprises a working part 10 which is surrounded by a vibration damper comprising an envelope in form of a single-walled sleeve 13 and a liquid-like material 16 being situated between the sleeve and the working part and advantageously comprising a liquid which hardens when being in contact with oxygen or humid air. The sleeve 13 is by means of clamps 15 or resilient rings clamped to reduced parts 14 which have been formed in the working part 10 by turning or otherwise. The working part comprises a shank 11 meant to be put into a (not shown) impact machine and a working end 12 for impact treatment of a material. The tool is futhermore provided with a collar 18 to restrict the backwards movement of the tool into the machine.

The tool according to FIG. 2 comprises part 20 having a shank 21, a collar 28 and a working end 22. The tool furthermore comprises a modified vibration damper. The vibration damper according to FIG. 2 comprises an envelope in form of a sleeve having two walls 23 and 27 between which the liquid-like material 26 is situated. The sleeve is by means of clamps 25 or resilient rings clamped to reduced parts 24 formed in the working part 20.

Figure 3:
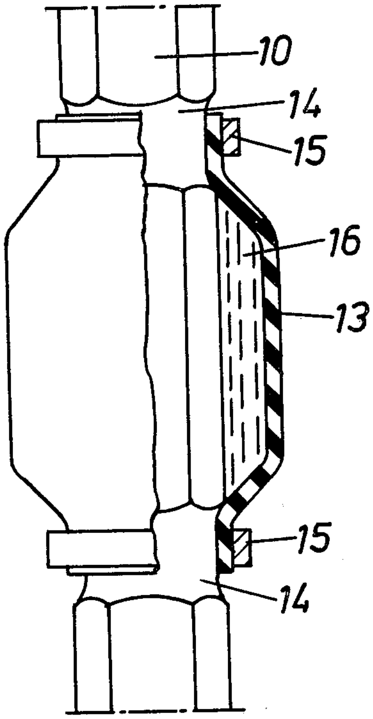
FIG. 3 shows a part of the tool according to FIG. 1 on a larger scale.
Figure 4:
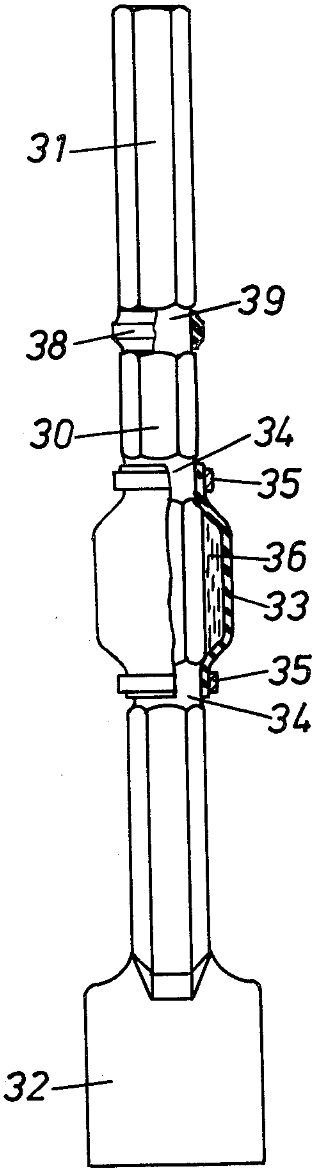
FIG. 4 shows a tool comprising a detachable collar.
Figure 5:
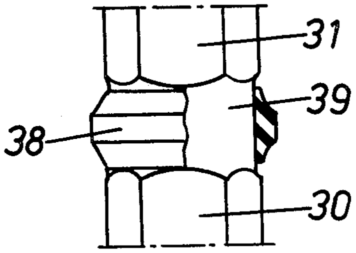
FIG. 5 shows a part of the tool according to FIG. 4 on a larger scale.

The tool according to FIGS. 4 and 5 comprises a working part 30 which is provided with a shank 31, a working end 32 in form of a spade and a vibration damper which comprises an envelope 33 which encloses a liquid-like material 36. The envelope 33 is by means of clamps 35 clamped to reduced parts 34 formed in the working part 30. The working part is provided with a detachable collar 38 which rests against a cut down part 39 and preferably is made of an elastic material e.g. rubber. The vibration damper is in this embodiment made as the one shown in FIG. 3. Since the tool is provided with a detachable collar the vibration damper can be mounted from behind.

If any of the above described vibration dampers is to be used for damping the sound of drill rods, it may be made longer so that it surrounds the main part of the length of the drill rod. In order to decrease the wear of the vibration damper the drill rod is provided with a collar in front of and a collar behind the vibration damper. These collars may be made such that they clamp the envelope of the vibration damper to the drill rod.

The sleeves 13 and 23, 27 and 33 shown in FIGS. 1–4 are made of rubber but can of course be made of another material e.g. steel since their only purpose is to enclose a liquid-like material in which the vibration damping is obtained because of the internal work.

The above described and in the drawings shown embodiments of the invention are only to be regarded as examples which can be modified within the scope of the subsequent claims.

What I claim is:

1. In an impact tool comprising an elongated working part (10; 20; 30) which includes a shank portion (11; 21; 31) for connection to an impact machine, a working end (12; 22; 32) and a collar (18; 28; 38) intermediate said shank portion and working end, said impact tool transmitting impact energy in its axial direction, a vibration damper for damping lateral vibrations in said impact tool, comprising:

an envelope (13; 23; 33) surrounding a portion of the working part of the tool intermediate said collar and working end; and a liquid-like material (16; 26; 36) enclosed within said envelope for damping lateral vibrations of said working part.

2. A vibration damper according to claim 1, wherein said envelope is an elastomeric envelope.

3. A vibration damper according to claim 1, wherein said envelope comprises a single-walled sleeve (13).

4. A vibration damper according to claim 3, comprising clamping means (15) for clamping the ends of said sleeve (13) to said working part (10).

5. A vibration damper according to claim 3, wherein said sleeve is an elastomeric sleeve.

6. A vibration damper according to claim 1, wherein said envelope comprises a double-walled sleeve (23, 27), and said liquid-like material (26) is situated between the two walls of the sleeve.

7. A vibration damper according to claim 4, comprising clamping means (35) for clamping the ends of said sleeve (23, 27) to said working part (20).

8. A vibration damper according to claim 6, wherein said sleeve is an elastomeric sleeve.

9. A vibration damper according to claim 1, wherein said vibration damper surrounds said working part along a shorter part of its length.

10. A vibration damper according to claim 1, wherein said liquid-like material (16; 26; 36) comprises a liquid which hardens when in contact with oxygen.

11. A vibration damper according to claim 1, wherein said liquid-like material (16; 26; 36) comprises a liquid which hardens when in contact with humid air.

12. A vibration damper according to claim 1, wherein said collar is a detachable collar (38).

* * * * *